US 6,584,098 B1

(12) United States Patent
Dutnall (10) Patent No.: US 6,584,098 B1
(45) Date of Patent: Jun. 24, 2003

(54) TELECOMMUNICATIONS SYSTEM (75) Inventor: Stephen Dutnall, Suffolk (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/142,146

(22) PCT Filed: Aug. 14, 1998

(86) PCT No.: PCT/GB98/02440

§ 371 (c)(1),
(2), (4) Date: Sep. 2, 1998

(87) PCT Pub. No.: WO99/12329

PCT Pub. Date: Mar. 11, 1999

(30) Foreign Application Priority Data

Sep. 4, 1997  (EP) ............................................. 97306877

(51) Int. Cl.$^7$ .............................................. H04L 12/66
(52) U.S. Cl. ....................................... 370/354; 370/401
(58) Field of Search ................................ 370/352, 353, 370/354, 355, 356, 357, 389, 392, 401, 402, 403, 404, 405, 406, 235, 236, 237, 238, 466; 379/93.01, 88.17, 219, 220, 221; 709/238, 239

(56) References Cited

U.S. PATENT DOCUMENTS

| | | |
|---|---|---|
| 5,533,019 A | 7/1996 | Jayapalan |
| 5,604,737 A | 2/1997 | Iwami et al. |
| H1641 H | 4/1997 | Sharman |
| 5,655,215 A | 8/1997 | Diachina et al. |
| 5,729,544 A | 3/1998 | Lev et al. |
| 5,799,072 A * | 8/1998 | Vulcan et al. ............... 379/114 |
| 5,809,128 A * | 9/1998 | McMullin .................... 379/215 |
| 5,983,281 A * | 11/1999 | Ogle et al. ................... 709/249 |
| 6,064,653 A * | 5/2000 | Farris .......................... 370/237 |
| 6,137,792 A * | 10/2000 | Jonas et al. .................. 370/354 |
| 6,219,547 B1 * | 4/2001 | Qaddoura et al. ........... 455/432 |

FOREIGN PATENT DOCUMENTS

| | | |
|---|---|---|
| CA | 2131349 | 5/1995 |
| EP | 0 766 490 | 4/1997 |
| WO | WO 95/31060 | 11/1995 |

OTHER PUBLICATIONS

Dettmer, Roger, "Packet Phone", IEE Review Mar. 1998, pp. 58–61.
Maamria, Kamel, "The Challenge of Internet Telephony", Telecommuncations, vol. 31, No. 3, Mar. 1997, pp. 91–98.

* cited by examiner

Primary Examiner—Kwang Bin Yao
(74) Attorney, Agent, or Firm—Nixon & Vanderhye PC (57) ABSTRACT

A system for carrying packetized voice and other delay-intolerant traffic, for example, a voice call for transmission over the Internet, over a circuit switched connection when such a connection is available. Incoming packets from a packet data network are identified by a gateway node as having voice characteristics and diverted to travel over a bridge to a circuit-switched network to a terminal, instead of a packet network. This reduces the load on the packet network, which is less suited to voice-type calls than is the circuit-switched network. In the reverse direction, suitable packets generated by the terminal may be routed to the gateway node by way of the circuit-switched network under the control of the terminal itself, or under the control of the network's interface with the terminal, either under the control of the gateway node or autonomously.

10 Claims, 11 Drawing Sheets

TELECOMMUNICATIONS SYSTEM

This invention relates to telecommunications systems, and in particular to telecommunications systems capable of carrying both voice and data.

Telecommunications systems have been developed for carrying many different types of traffic. For the purposes of the present invention, these can be grouped into two different basic types of telephony system, known as "circuit-switched" and "packet-switched".

In a circuit-switched system, a connection between source and destination is established at the beginning of a call, and reserved for the exclusive use of that call, for the duration of the call. The reserved resources may be a complete physical telephone line, but for most parts of the system it is likely to be a timeslot in a time division multiplex system and/or an allocated part of the spectrum in a (radio) frequency-division, or (optical) wavelength-division, multiplex.

In a packet-switched system, data to be transmitted from one point to another is formed into short elements (known as packets) which are each handled separately, and routed according to the availability of network resources at the time of the transmission of the individual packet. This allows a large number of individual data messages to be sent simultaneously over any particular leg of the network, by interleaving packets of different calls over that leg. It is also possible to route different parts of the data (i.e. different packets) by different parts of the network, if there is insufficient capacity on any one route for the entire message. Each data packet carries an individual signalling overhead indicating the destination of the packet, so that at each node in the network the packet can be routed towards its ultimate destination. It also carries a sequence number, to identify its position within the complete message, so that the receiving party can re-assemble the packets in the correct order at the receiving end, and can identify whether any packets have failed to arrive.

Figure 11:
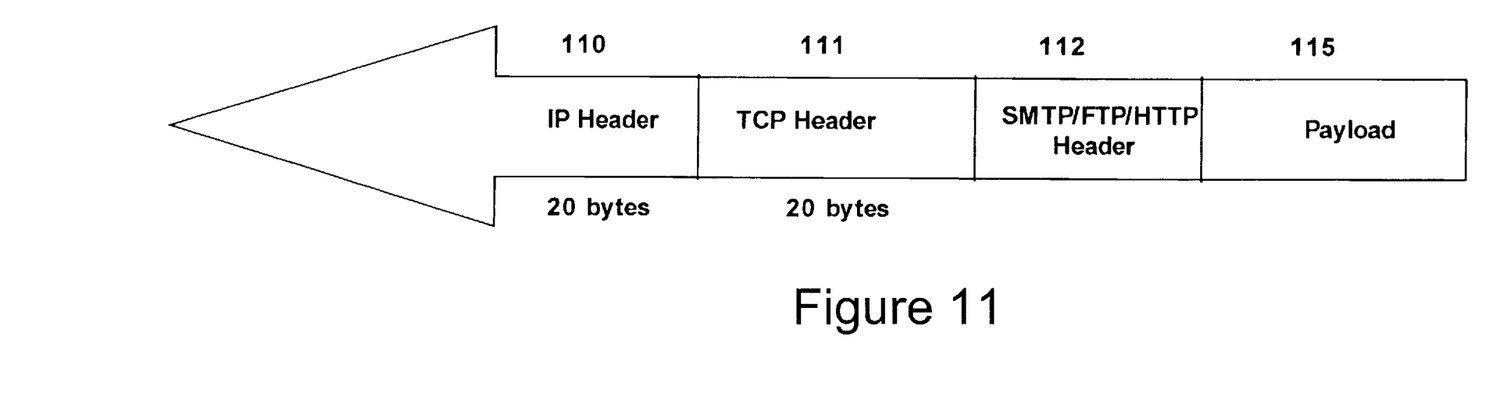
FIGS. 11 and 12 illustrate the packet header protocols for IP/TCP and IP/UDP, and have already been discussed.

Various transaction protocols exist, such as "TCP/IP" (Transport Control Protocol/Internet Protocol), illustrated in FIG. 11, which shows the headers to be found in an individual packet. The initial Internet Protocol (IP) Header 110 (typically 20 bytes) defines the destination, the source, and information such as the transmission protocol to be used. There follows further header information 111 according to the indicated transmission protocol, which in this case is "TCP" (Transmission Control Protocol). This comprises a further 20 bytes, which includes information indicating which file transfer protocol is to be used—for example SMTP (Small Message Transfer Protocol), FTP (File Transfer Protocol) or HTTP (HyperText Transfer Protocol). Further header information 112 follows, specific to the indicated protocol. The remainder of the packet comprises the information to be conveyed, known as the "payload" 115.

It is known, for example from International Patent Application no. WO95/31060, and U.S. Pat. No. 5,729,544, to select a circuit-switched or packet-switched routing for a packetised message, according to the message transfer protocol indicated in the TCP header 111. This allows short messages using the "SMTP" protocol to be packet-switched, whereas lengthy messages such as large computer files using the "FTP" protocol can be sent over a circuits-switched route. The greater amount of processing required to set up a circuit-switched link, as opposed to that required to transmit individual packets, is offset by the fact that the processing for a circuit-switched link only has to be done once.

However, this arrangement takes no account of the information content of the data to be transmitted. Certain types of information content are inherently more suitable for circuit-switching, and others are more suited to packet-switching. In particular, these information can be grouped into two principal classes, referred to herein as "delay-intolerant" traffic, and "corruption-intolerant" traffic.

Traditional voice telephony is "delay-intolerant". This class also includes such types of traffic as live video links etc. For such calls it is important that the time taken for the traffic to travel from source to destination remains constant, and as short as possible. This requirement is more important than the completeness of the data. For example, in a digitised voice signal there is, from the listener's point of view, considerable redundancy in the signal, so the loss of some digital information in the voice signal can be tolerated whilst still providing an acceptable signal quality at the receiving end. However, a delay in transmission, particularly if it is not constant, can be very distracting and make conversation difficult.

In contrast, digital data signals representing text, numerical data, graphics, etc. can be transmitted with considerable variation in the length of time different parts of the data take to get from the source to the destination. In some cases different parts of the signals may be delayed by such differing amounts that the data may not arrive in the same order that it was transmitted, but the original data can be reconstructed if the order in which it is transmitted can be determined. This is achieved by labelling each packet with a position label, indicating its position in the sequence. In such transmissions the completeness of the data is more important than the time it takes to get to its destination, so it is referred in this specification to as "corruption-intolerant".

Corruption-intolerant data are preferably carried by means of a packet-switching system. The system transmits each packet as a self-contained entity and reliability of transmission takes priority over speed, so the loss of an individual packet is unlikely. If such a loss does occur, it can be identified by a gap in the sequence of position labels, and its retransmission can be requested.

However, packet-switching is inappropriate for delay-intolerant call traffic. This is firstly because there is no certainty that each packet will take the same route and therefore take the same amount of time. Furthermore, such traffic tends to be of a more continuous nature, ill suited to the intermittent nature of a packet-switched system. The division of the call into packets, (requiring each packet to have its own addressing overhead), adds a significant data overhead to the call. This also adds to the amount of processing overhead that is required to route each packet through the system. For such types of call traffic the point-to-point "circuit-switched" system of conventional telephony is more appropriate, because in such a system resources are reserved end-to-end throughout the duration of the call.

A circuit-switched system cannot offer efficient connectionless packet-switched transmission. Likewise it is difficult for packet-based systems to support delay-intolerant applications with the same quality of service as traditional circuit-switched telephony systems provide. From a network operator's point of view it is more efficient to route corruption-intolerant (delay-tolerant) calls by way of a packet-switching system and delay-intolerant calls by way of a circuit-switching system. However, an individual user may wish to use one terminal connection for both types of transmission. The prior art system already discussed only distinguishes between protocols generally used for large file sizes (e.g. HTTP and FTP), and those for small files (SMTP). These do not relate to the information content of those files. In particular, it is possible to generate a voice signal or other delay-intolerant bit stream on, for example, a computer, and transmit it as a data stream by way of a data terminal. A particular example is the use of the "Internet" for carrying voice and video messages. If the communications system handles such a call as a conventional data call, the voice or picture quality perceived at the remote end can suffer from having been packet-switched rather than circuit-switched. Conversely, handling data over a circuit-switched system is both inefficient of resources, and less reliable than packet-switching.

It is desirable from the user's point of view to have the capability to carry all types of traffic, whether delay-intolerant or corruption-intolerant, over the same system. This allows, for example, a voice message to be accompanied by supporting text (data). It also allows the user to use the same telecommunications connection for all types of traffic, avoiding the need, for example, to have two separate connections. However, the perceived quality of a delay-intolerant call can be severely impaired if such a call is packet-switched, and vice versa.

Figure 12:
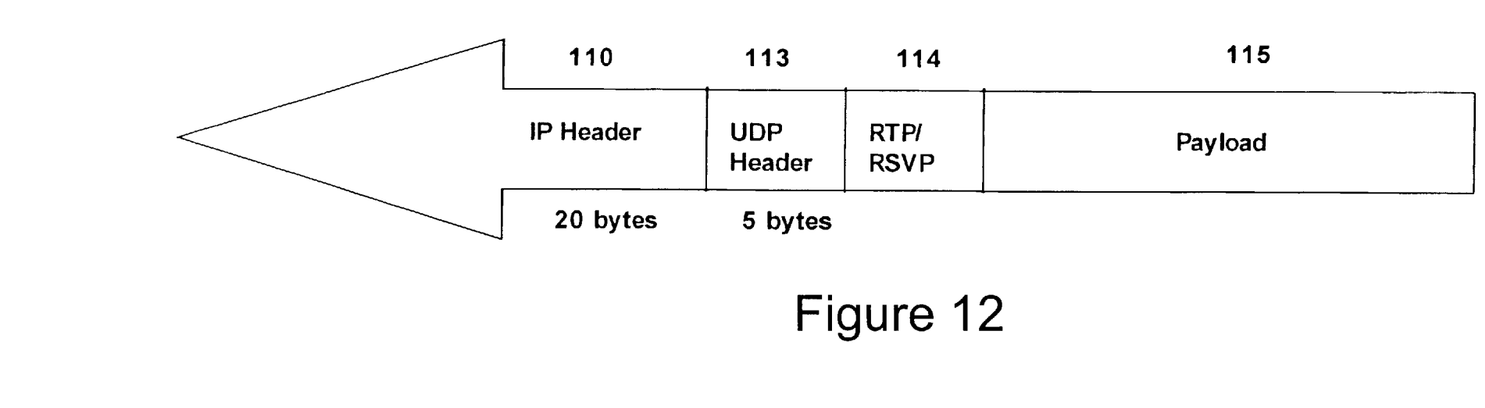

Currently there exist proposals to allow delay-intolerant applications to be run over Internet Protocols. One such application is "Voice over IP" (VoIP), using a protocol known as "User Datagram Protocol" (UDP), which is illustrated in FIG. 12. This uses the same initial IP Header 110, as discussed in relation to FIG. 11, but in this case it is followed by a UDP Header 113 of five bytes. It may be followed by other header information 114 controlling the way in which the payload 115 is to be handled. This differs from the TCP protocols 112 (FIG. 11), which indicate how the data has been formatted, (e.g. compressed). The header information 114 indicates the priority of the packet. For example, a "Reservation Protocol" (RSVP) may be included, which in effect reserves buffer space in the IP router and prioritises the packets so they are executed first. To avoid undue congestion and delay, a "Real Time Protocol" (RTP) has also been proposed. This includes a "time stamp", and indicates that any packet carrying this protocol should be discarded, without being processed, if it arrives at the destination more than a predetermined time after the time indicated by the "time stamp". The combined use of these two protocols allows the balance between delay and data integrity to be modified, in a packet-switched system, to be more appropriate for a delay-intolerant message. Corruption-intolerant UDP messages, for which data integrity takes priority over speed of transmission, are unaffected, as they do not carry these protocols.

Although the use of these protocols avoids causing excessive delay to a voice signal or other delay-intolerant signal, they require significant extra processing overhead, and cause some impairment of quality compared with the use of a circuit-switched system. It is therefore desirable to carry such calls over a circuit-switched system if such a system is available for all or part of the end-to-end connection.

According to the invention there is provided a method of selecting routing for a corruption-intolerant or delay-intolerant call type between the terminal and a packet-switching gateway such that a corruption-intolerant call is routed by a packet-switching system and a delay-intolerant call is routed by a circuit-switched system to or from the packet-switched gateway, wherein the presence or absence of a data protocol specific to one of the types of call is recognised and the routing between the gateway and terminal selected accordingly.

According to a second aspect of the invention there is provided apparatus for routing corruption-intolerant and delay-intolerant calls between a terminal and a packet-switching gateway such that a corruption-intolerant call is routed by a packet-switching system and a delay-intolerant call is routed by a circuit-switched system to or from the packet-switched gateway, comprising means for recognising the presence or absence of a data protocol contained in a data packet of the call, and means for routing the call between the gateway and the terminal accordingly.

Transmissions received over the packet-switched system, but which are suitable for circuit-switching, can therefore be sent via a circuit-switched route, where one is available. This routing reduces the complexity needed in the routers of the packet system as well as reducing the amount of paging that would be required if the session was set up over the packet route. In particular, in a cellular radio packet call each packet requires a separate request to locate the mobile unit, there being no continuous location update as there is with a circuit-switched cellular call.

Preferably, the method comprises the step of intercepting the packetised call set-up data, identifying if one of the said protocols is incorporated in the packet-based call, and if it has been so incorporated, switching the call from a packet-based system to a circuit-switched system. If a packet received by the packet-switching gateway over a circuit-switched system is for onward transmission to another destination served by the same circuit-switched system, the call may be redirected to the destination without passing through the packet-switching gateway, thus making the call circuit-switched throughout.

The gateway may be capable of detecting the type of destination terminal to which the call is to be transmitted, and of selecting a first mode of operation in which the protocols are retained in the transmission or a second mode of operation in which the protocols are removed, according to the destination type.

The destination of a call may be identified from an address header of the first packet of a call, so that a switched circuit can be opened between the gateway and the destination, and subsequent packets having the same header then similarly routed over the same circuit, which is maintained until the end of the message.

The apparatus may form part of a telecommunications terminal, or part of the packet-switching gateway itself.

The invention may form part of a proposed enhancement to the cellular radio system known as GSM (Global System for Mobile Telephony), which will be arranged to support both voice and data traffic. In this proposed enhancement, signals received by the fixed radio base station over the "air interface" from the mobile unit are identified by the mobile unit to the base station's operating system and routed according to whether they are conventional digitised telephone signals or "mobile - IP" (Internet Protocol) data signals. If they are telephone signals they are carried over the conventional cellular radio circuit-switched system. If they are Internet Protocol they are routed by way of a packet-switched system, specifically the proposed General Packet Radio System (GPRS). Similarly, voice calls destined for a mobile node can take a different route to the base station from those taken by packet based calls. This allows the GSM network to efficiently transport both packet based and circuit-switched data by sending it via the appropriate transport mechanism. Some resources are shared for both mechanisms, both over the air interface and the Base Site Controller of GSM, and both mechanisms can interrogate the Home Location Register, which contains the subscriber's profile information and identity.

A preferred embodiment of the invention introduces a gateway node to this system. This gateway node intercepts the set-up codes in a packet, and identifies whether a RTP or RSVP protocol is present. If one of these protocols is present in the packet, the gateway node then switches over from the packet-based GPRS to the GSM circuit-switched system, allowing packetised voice calls to be carried over the circuit switched system.

The gateway node allows the use of the circuit-switched GSM system when using VoIP, thus removing the need to support RSVP and RTP protocols in the GPRS system, and allowing the delay-intolerant call to be circuit-switched within the GSM part of the call routing.

By providing this bridge between the two systems, the GSM operator can now support normal circuit-switched speech, data (both circuit-switched and packet-switched) and VoIP, with minimal modification to the network.

An embodiment of the invention will be further described with reference to the accompanying drawings in which;

FIGS. 8, 9 and 10 are flowcharts showing the operation of the gateway and associated network elements. More specifically;

Figure 1:
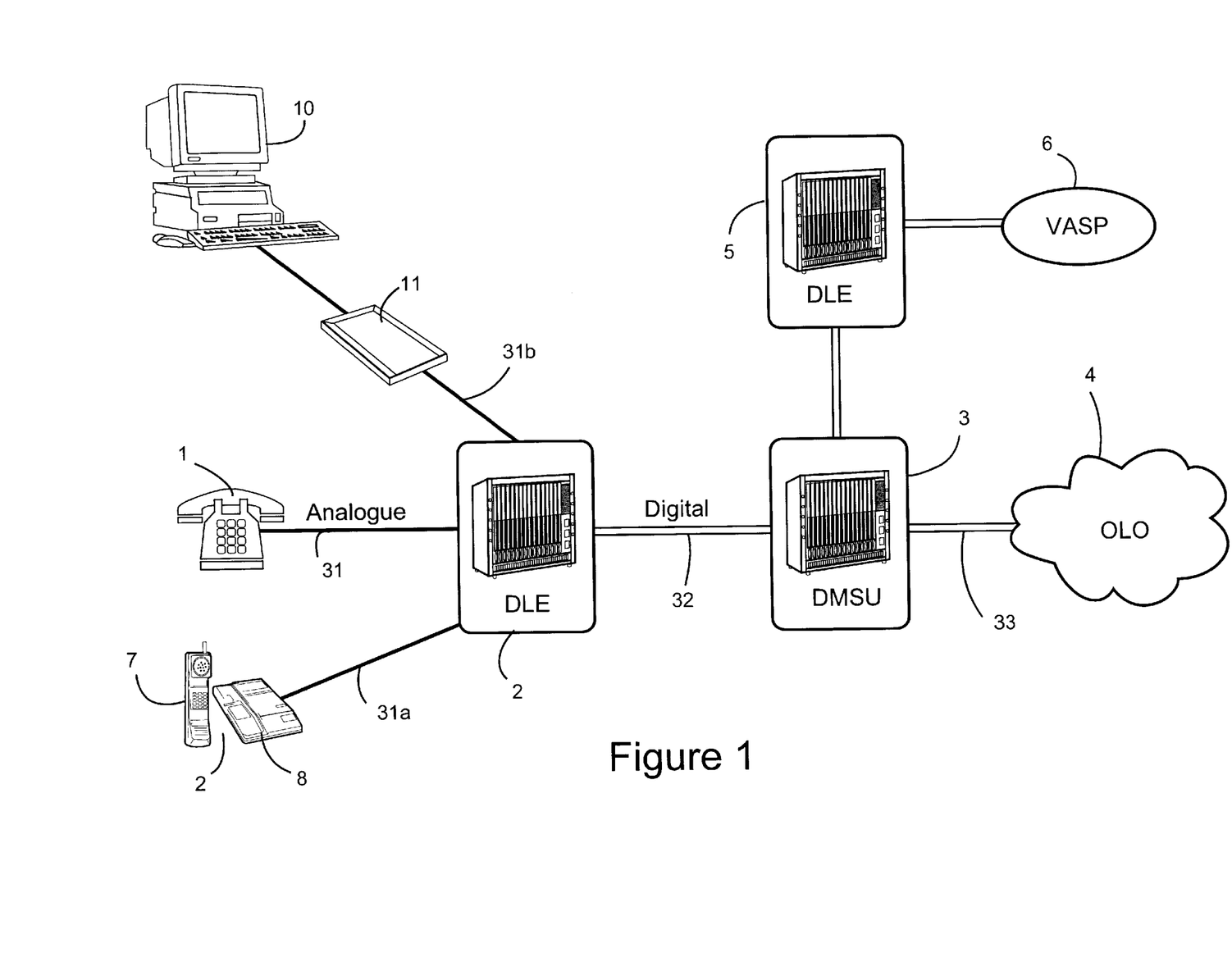
FIG. 1 illustrates schematically a conventional circuit-switched digital telephone network.

FIG. 1 shows a simplified circuit-switched telephone system. A telephone handset 1 is connected by an analogue link 31 to a digital local exchange (DLE) 2, and from the local exchange 2 over a digital network 32 to a digital main switching unit (DMSU) 3 which provides connection 33 to another telephone line through that other line's operator (OLO) 4. Typically the connection 33 to the other line will be through a further DMSU, DLE and handset (not shown). In the special case where both handsets involved in the call are attached to the same DLE, or to different DLEs attached to the same DMSU, then connection can be made at the appropriate level without going through the higher levels in this hierarchy. Also attached to the DMSU 3 is a further digital local exchange 5 serving a value-added service platform (VASP) 6. This supports functions such as number translation, by directing the DMSU 3 to translate and route a call according to a number translation programme in the VASP 6.

In this traditional circuit-switched architecture, when a handset initiates a call, a dedicated circuit 32, 33 etc. is provided between the DLE 2 (connected to the first handset 1), and the DLE connected to the second handset, through the intermediate DMSU 3. The "circuit" may, typically, comprise a timeslot of a time division multiplex. As shown in FIG. 1 the circuit-switched system can also support other types of handset, such as a cordless telephone (i.e. a handset 7 connected by a radio link 32 to a base station 8) connected to the telephone line 31a, or a computer terminal 10 connected, through a modem 11, to the telephone line 31b. The modem 11 translates digital information generated by the computer terminal 10 into sound signals suitable for transmission to the DLE 2 over the analogue link 31b. At the DLE 2 all analogue signals, including signals representing digital information such as from the modem 11, are digitised for transmission over the core network.

Although the traditional telephone network can be used for carrying computer-generated pulses, by use of a modem 11, it is not optimised for such use. The traditional telephone network now incorporates a number of features to optimise the transmission of voice signals. The tones generated by computer modems and facsimile machines have to be transmitted over such a network. They therefore have to be within the same 300 Hz to 4000 Hz band as human speech to allow them to be transmitted, and not be corrupted by the 8 kHz sampling rate generally used in digitising speech. Furthermore, systems are now being developed to eliminate non-speechlike audible interference from speech signals, which will make the transmission of data over voice circuits even more difficult.

A further problem for the telephone network when used for transmitting computer data is that computer data tends to be transmitted in discontinuous form, more suited to packet-switching techniques. However in a circuit-switched system the line 32, 33 needs to be kept open throughout the call. Furthermore the voice calls for which a circuit-switched call is optimised require only a relatively narrow bandwidth, requiring that data be transmitted at a relatively slow rate if carried over a system optimised for speech. Packet-switched systems generally have a high bandwidth, and can carry much higher instantaneous data rates.

Figure 2:
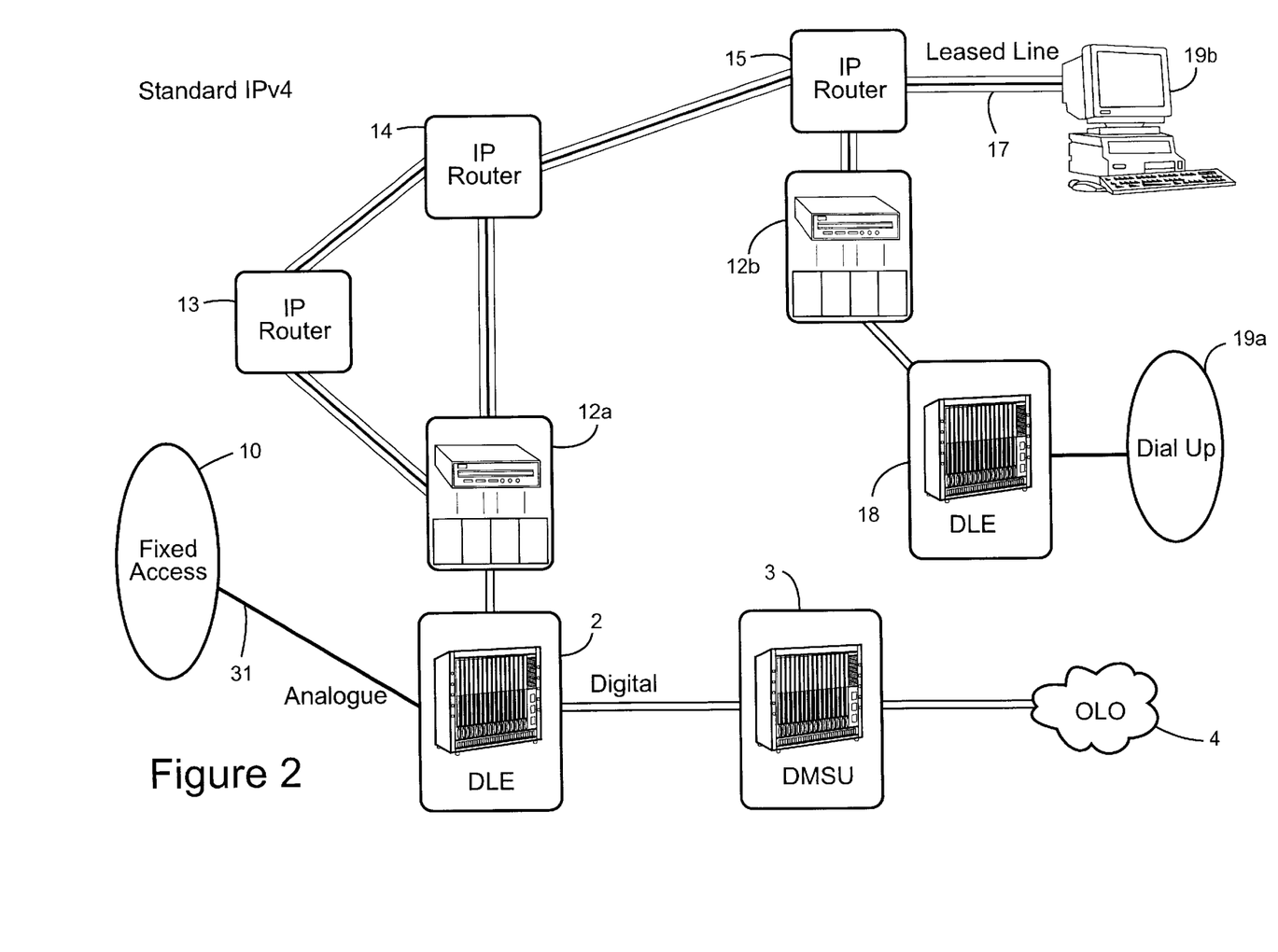
FIG. 2 illustrates schematically a typical packet-switched data network.

FIG. 2 is a schematic showing a packet data network according to the IPv4 (Internet Protocol version 4) standard. As in the circuit-switched arrangement of FIG. 1, the user 10 has a fixed access analogue line 31 to the digital local exchange 2. The user can phone up the Internet server 12a. The DLE handles the call normally, that is, as it would a normal voice call, by digitising the analogue signals from the modem. These digits are now packetised at the Internet PSTN node 12a. This divides the data message into a number of individual packets, each of which is headed by an address header indicating the ultimate destination of the message. (Each packet requires this address as the packets are transmitted individually). Each packet in turn is then transmitted to a router 13, which in turn selects the route most appropriate for the ultimate destination of the packet, given geographical, topological, and network capacity considerations. Not all packets are necessarily sent by the same route. Each packet is passed from each router to the next (13, 14, 15). For each packet it receives, each router decides where to send it next, according to the address header on the packet and information stored in its routing tables such as the current capacity on the links to other routers. Packets may be routed to a terminal 19b connected to a dedicated Internet leased line 17 which can handle the packetised data directly. Alternatively, packets may be routed to another Internet PSTN node 12b which converts the packet to PCM format, to be routed as a normal digitised voice call to a digital local exchange (DLE) 18 serving the destination terminal 19a. In this case the digital format has to be converted back to analogue form in the DLE 18, as for speech, and sent to the terminal 19a. At the terminal 19a the modem reconverts the analogue signals back into digital and the packet is processed, including its IP address. If a packet fails to arrive, or cannot be buffered, it may be necessary to request its re-transmission on a peer-to-peer level via higher protocols, such as the Transmission Control Protocol (TCP) already mentioned.

Figure 3:
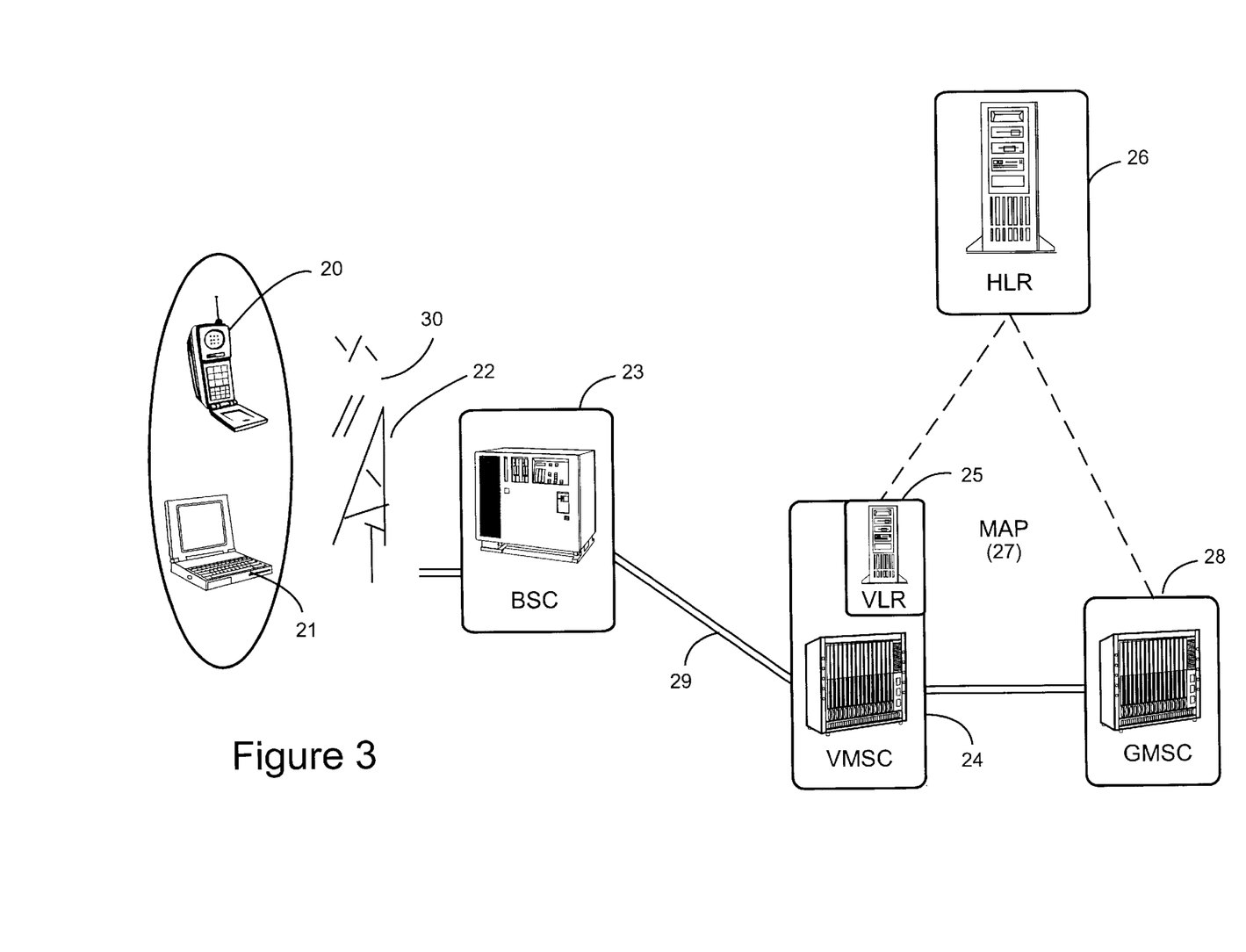
FIG. 3 illustrates schematically a GSM cellular radio network.

FIG. 3 shows a typical cellular radio architecture. Mobile terminals configured either for voice (20) or data (21) may be in radio communication with a base transceiver site 22 which provides a link to a Base Site Controller (BSC) 23. The base Site Controller 23 controls the radio interface 30 with the mobile terminals 20, 21, and has a fixed link 29 to a Mobile Switching Centre 24, termed a "Visitor Mobile Switching Centre", or VMSC. Associated with the Mobile Switching Centre 24 is a visitor location register (VLR) 25. The register 25 stores data relating to the cellular handsets currently served by the Mobile Switching Centre 24. The VLR 25 receives data from a Home Location Register (HLR) 26 which has a permanent store of data associated with each cellular radio user registered with the HLR 26. This data is transmitted to a VLR 25 when the MSC 24 establishes contact with the respective cellular handset 20. Communication between the HLR 26 and VLR 25 is carried out over an applications protocol known as mobile application part MAP (27). Interconnection to other operators and other networks, to enable mobile-to-fixed, and mobile-to-other-mobile calls, are carried out by Gateway MSCs (GMSCs) 28.

Due to the limited amount of radio resource available, and to the fact that the terminal is mobile, the network may have to change allocation of channels to terminals, because of through congestion, or because the terminal goes out of range of a transmitter. Such a forced change in channels is called a handover. Handover arrangements are slightly different for packet-based systems and circuit-switched systems. For packet based systems delays in handover can occur, with the application being unaware of any break in "contact", provided that all packets finally reach their correct destination. For voice and other delay-intolerant applications such breaks must be kept to an unobservable minimum, so that the handover appears seamless.

For a data message, each packet transmitted to the mobile unit causes the setting up of a brief cellular call, including the necessary paging and other functions required to establish the present whereabouts of the mobile unit. (In most cases this will of course be the same location as for the previous packet of the message). The call clears down after each packet so, when a further packet is to be transmitted, a new call must be established. This adds delay to the transmission of each packet, but releases the resources between packets. The second packet may be transmitted on a different channel to the first, and, if the mobile unit has moved since the previous packet, the location update process will automatically establish a call for the new packet at the new location. In contrast, in a circuit-switched call the handover between locations has to be managed such that contact is established with the second base station before it is lost from the first, to allow continuity of the connection.

Figure 4:
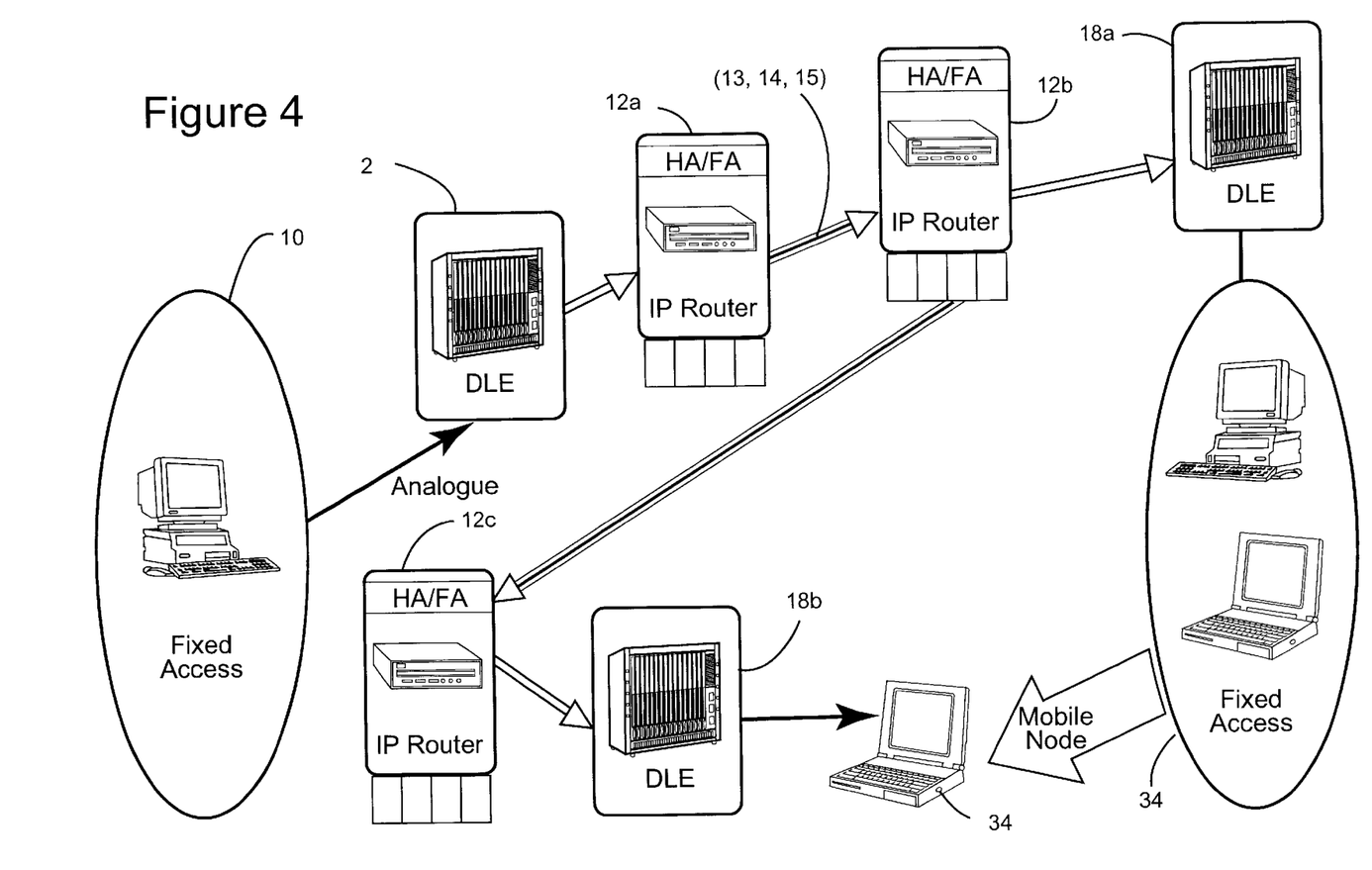
FIG. 4 illustrates schematically the General Packet Radio System (GPRS).

As shown in FIG. 4, the Mobile Internet Protocol version 4 (MIPv4) allows the redirection of packets encapsulating the original IP address. It is based on "semi-permanent" mobility cases, in which a terminal 34 can move from one place to another only between sessions, so as not to require handovers and resource management control. This is done by a "Home Agent" 12b associated with the destination DLE 18a (as defined by the address). The Home Agent 12b allocates to the terminal 34 a temporary "Care of" Address (CoA) of a visited server 12c, and arranges that packets arriving at the home agent 12b are forwarded onto this "foreign" server 12c. When the packet arrives at the foreign server 12c the header is stripped off and the packet is sent down to the terminal 34. It will be appreciated that there may be a more direct route between the transmitting node 12a and "foreign" receiving node 12c than by way of the home node 12b: the transmitting node and foreign node (12a and 12c) may even be one and the same if the terminals 10 and 21 are currently served by the same DLE. This can result in "tromboning": the setting up of an unnecessarily circuitous end-to-end path passing through a user-specific intermediate point (server 12b in the present case). To avoid this the home agent 12b may be arranged to return the current "Care of" address to the correspondent (transmitting) node 12a on receiving the first packet. This allows subsequent packets to be encapsulated with the CoA at the original correspondent node 12a, and avoids the need to send packets (other than the first) by way of the home agent 12b.

When the terminal 34 moves into the domain of a new foreign agent 12c a new CoA is allocated, on request from the terminal 21. It does this by analysing an "advertising" signal broadcasted by the foreign agent 12c. If the signal differs from the one the terminal 34 is currently registered to, the terminal 34 automatically requests a new CoA from the foreign agent 12c, which it returns to its Home Agent 12b. The advertising signal is broadcast at a maximum frequency of 1 Hz with up to 3 consecutive errors permitted before a decision is made, (hence taking up to 3 seconds before registration is successfully carried out).

In the scenario depicted above, while the mobile terminal 34 is at the home agent 12b the IP address is unchanged and it receives and transmits packets as normal. If the terminal then moves outside this area to another, "foreign" agent 12c, on a network 18b, the mobile unit 34 registers onto this network 18b to obtain a CoA, which is reported to the home agent 12b. Once registration has occurred the terminal 34 can receive packets, (either forwarded by way of the home agent 12b (or redirected to avoid "tromboning" as described above), as if it were in its home network 18a.

Transmission of packets from a mobile terminal is more straightforward than reception by such a terminal, as all routers can recognise any IP address, so whichever router 12b, 12c is currently serving the terminal, it will have the capability to transmit the call towards the correct destination.

Figure 5:
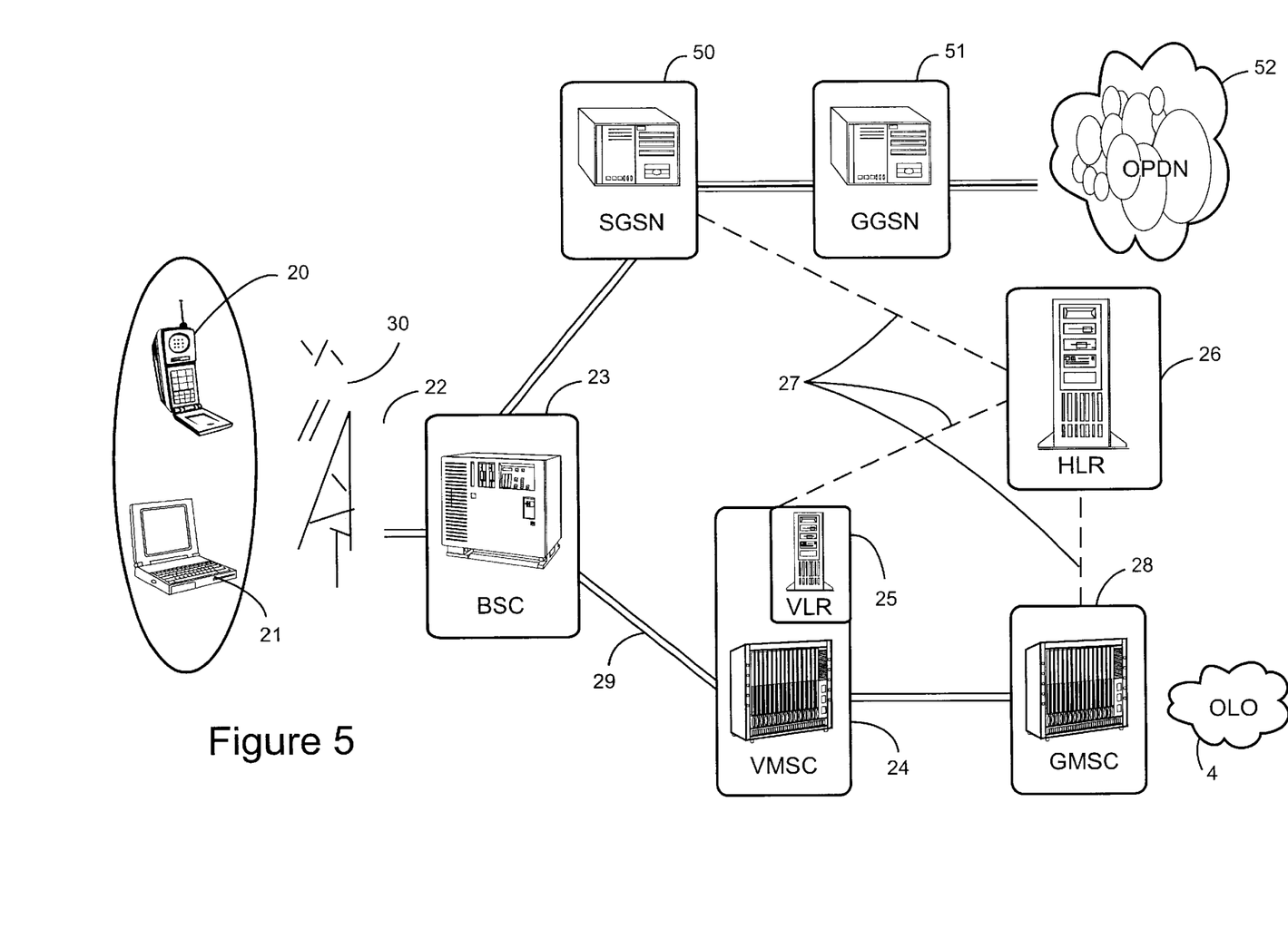
FIG. 5 illustrates schematically the existing interface between the GSM cellular radio system and the General Packet Radio System (GPRS) networks.

GPRS uses a mechanism similar to that of Mobile IP, but is in fact an overlay network on the GSM circuit-switched mechanism, as shown in FIG. 5. It consists of two dedicated GPRS IP routers 50, 51 and an IP backbone network 52.

The serving GPRS support node (SGSN) 50 is connected, by way of a base site controller 23, to the mobile unit 21, in the same way that the VMSC 24 is connected. The Serving GPRS Support Node 50 contains the identity of the terminal in its routing tables, which are inserted when the terminal 21 registers with the network. The second node, known as the Gateway GPRS Support Node (GGSN) 51, contains the SGSN's identity, to encapsulate the headers of any packets that arrive from other packet data networks (OPDN) 52 for the terminal 21 (identified by the terminal's IP address). It basically performs functions analogous to those of the Home Agent/Foreign Agent routers 12a, 12b, 12c of Mobile IP, previously described.

FIG. 5 also shows the association between the GSM cellular radio system and the General Packet Radio Service (GPRS). In this system a different identity is given to messages being sent to the packet system, 50, and those messages sent to the circuit-switched system, 24. The Home Location Register 26 is sent information from the VMSC 24 via the mobile applications part (MAP) protocol 27 to inform the HLR of the mobile unit's location. Any change in location for the packet mechanism is updated directly between the SGSN 50 and GGSN 51.

The introduction of the GPRS mechanism provides a connectionless support for data transmission, allocating resources only when there is something to be transmitted. It also provides variable bandwidth on demand (resource permitting) up to a maximum of 76.8 kbit/s. It is basically an overlay connectionless network, based on the Internet Protocol, which shares the network of Base Sites and Controllers 22, 23 with the GSM network 24, 25, 28. It interconnects with the GSM nodes (VMSC 24 and HLR 26) via the MAP protocol 27. Optional interconnections between the nodes VMSC 24 and SGSN 50 allow for some commonality between the two systems, optimising functions which could be repeated in them, such as location update and paging. The GPRS proposal does not require the GPRS network to have a connection between the Gateway GPRS (GGSN) 51 and the HLR 26, (which would allow network-initiated context control). If such control is not provided, a packet arriving at the GPRS network when the terminal has not already carried out a GPRS registration, is simply discarded. Connection Oriented speech and data received by way of a circuit-connection system 4 would use the standard GSM capability 24, 25, 28. Connectionless data received by way of a packet data network 52 would use the GPRS capability. Security and mobility procedures are carried out in the SGSN 50 and VMSC 24, any additional information required would be provided by further interaction with the HLR 26.

GPRS provides an efficient transport mechanism for file and message data types, by only allocating resources over the air interface when required. This provides the theoretical potential to cater for more subscribers, or more constant use of the resource, and so generate further revenue. In effect the GSM operator now has two sub-networks in one, a packet dedicated network (GPRS) 50, 51, 52 and a circuit-switched dedicated network (traditional GSM) 24, 25, 28, 29, sharing facilities such as the network of base stations 22, 23, and the Home Location Register 26.

Developments are currently being made in transmitting voice calls over the Internet. They are able to do this due to the introduction of a "ReSerVation Protocol" (RSVP) which reserves resources similar to those used by a circuit-switched call. Other Internet protocols are also present in "Voice over IP" calls, such as the "RTP" protocol. The RTP protocol "time stamps" an individual packet to allow the recipient terminal to decide to discard it if it is delayed in transmission by more than a predetermined time, thereby allowing later packets to be processed more promptly. Any of these protocols may be used to recognise a voice call, but the RSVP protocol is preferred, because the IP routers already need to recognise the RSVP protocol to reserve resources. They do not need to recognise the RTP protocol as this is only used by the terminals. (The routers may be arranged to recognise both protocols, as a check to prevent abuses of the system by transmitting RSVP protocols without RTP protocols, thereby upsetting the balance between "delay-intolerance and corruption-intolerance.)

A packet-based system is inherently inefficient for transporting speech. The invention allows speech to be switched to a circuit-switched system when access is possible to both a circuit-switched (speech efficient) system and a packet-switched (data efficient) system.

Figure 6:
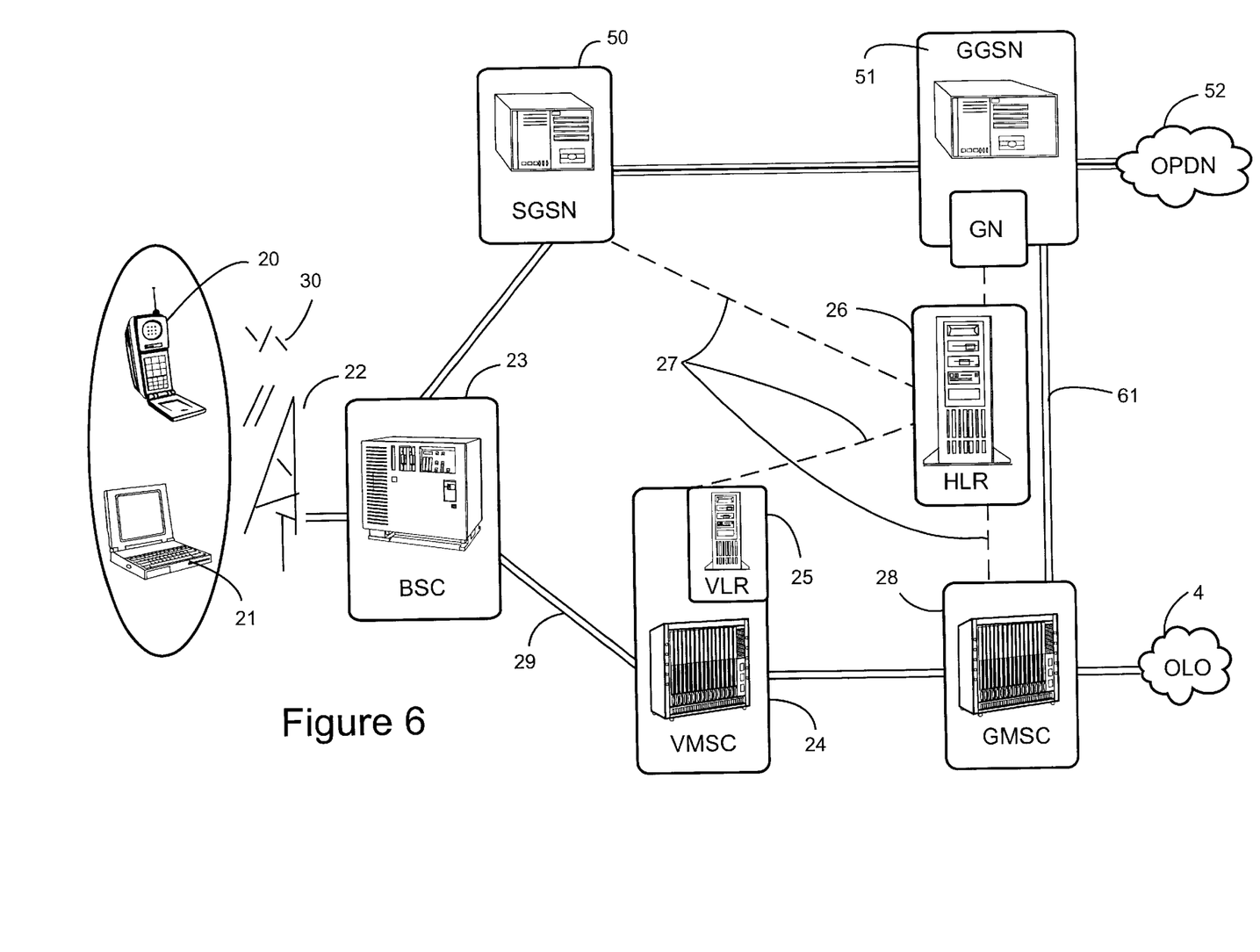
FIG. 6 illustrates schematically a modification to the interface of FIG. 5 according to the invention.
Figure 7:
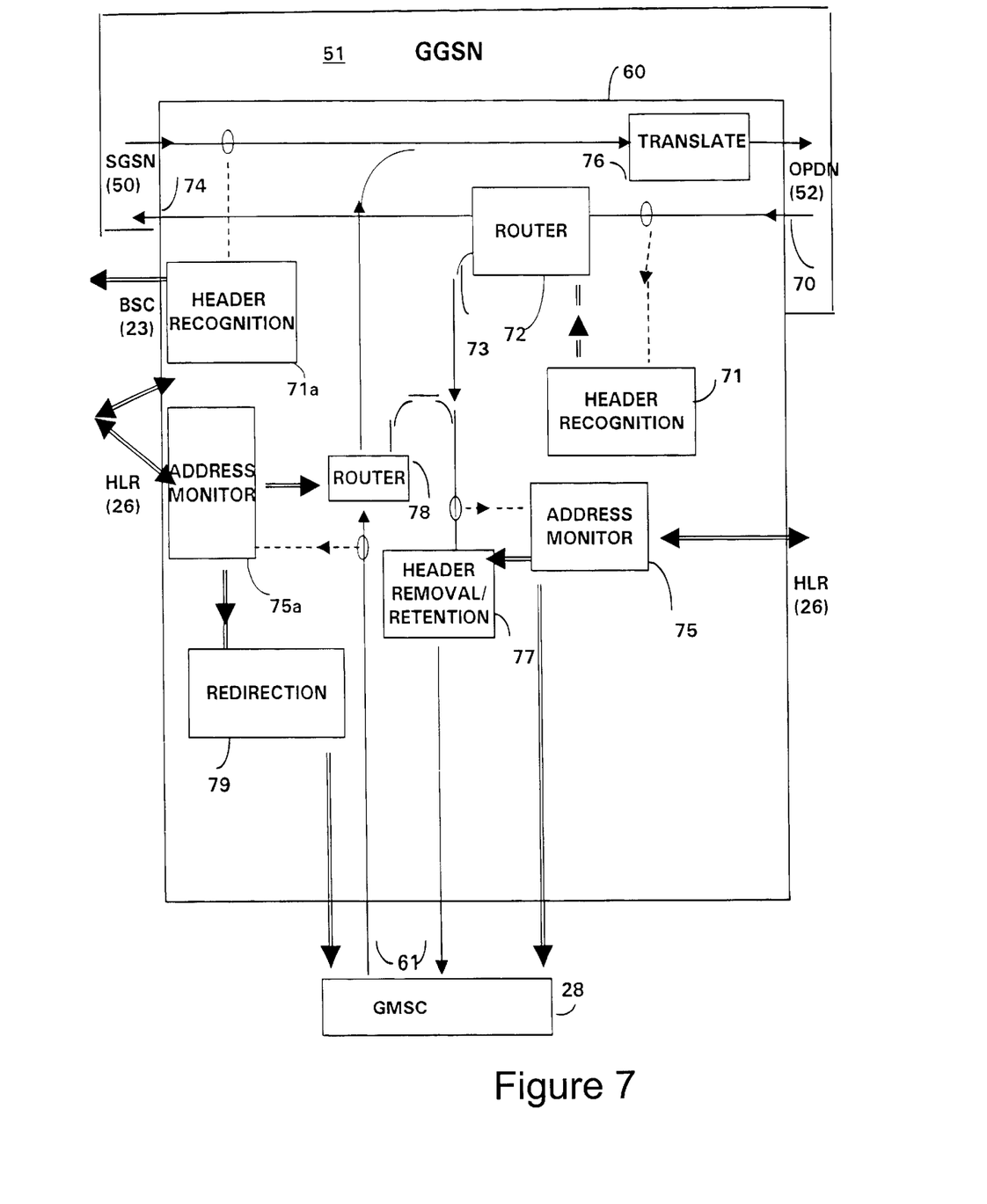
FIG. 7 is a schematic representation of the functional elements of the Gateway Node 60 of FIG. 6.

FIGS. 6 and 7 illustrate the invention, which provides an interface in the system described above, to allow such voice calls to be switched between the Internet and a circuit-switched connection. FIG. 6 shows a modification of the system shown in FIG. 5, according to the invention, in which a gateway node 60 is inserted in the gateway GPRS support node (GGSN) 51, and FIG. 7 illustrates the functional elements of the gateway node 60 shown in FIG. 6. This node 60 provides access to a bridge 61 between the packet data network 50, 51, 52 and the cellular switching system 24, 28. For packet data calls transmitted to the cellular user 20, 21 the Gateway Node 60 identifies the request to reserve resources (using the RSVP protocol), indicating a voice-like delay-intolerant call over the Internet. If this protocol is identified by the gateway node 60, the call is transferred to the gateway Mobile Switching Centre (GMSC) 28 over the bridge link 61, for transmission over the fixed part of the cellular voice network 28. The HLR would be interrogated and the call set up as in a 'normal' circuit-switched call, be it circuit-switched data or Internet speech. The call would then be routed to the VMSC 24, thence to the BSC 23, the BTS 22 and finally to the handset 21.

The header protocols may be maintained for receipt by a mobile data handset 21 running Voice over IP (VoIP), as would be conventional for a packet-switched message. Alternatively, the invention may allow the facility to transmit direct to a normal voice terminal 20. In this case the gateway node 60, detecting the destination type, is arranged to remove the packet headers, including the IP address (after using them to identify the destination), and invoke voice encoding at the BSC 23. Thereby it can transmit the voice message in a form which can be handled by the voice terminal 20.

For a terminal-originating data-call using RSVP a data call is generated encapsulating the RSVP protocol. Control of routing may be carried out by the terminal 21, the base station 23, or by the gateway node 60.

If routing is carried out by the terminal 21, the terminal 21 sends the call to the BSC 23 as if it were a normal circuit-switched call to be sent to the gateway node 60, using the Gateway Node's point code address (directory number or equivalent) according to ITU standard E. 164. The BSC 23 routes the call, as a normal circuit-switched call, to the VMSC 24 and thus to the GMSC 28 and gateway node 60. The Gateway Node 60 translates the point code address to the GGSN's IP address. The packet is then forwarded to the GGSN 51. The GGSN removes this encapsulated IP header revealing the intended IP destination address. The GGSN 51 then sends the packet into the IP network 52 to be routed and processed as normal. The GGSN/GN relationship is added into the GGSN's routing table to forward further packets when they arrive. By giving the mobile unit 21 the decision on where to send the packet, any need for added functionality in the BSC 23, VMSC 24, SGSN 50 and GGSN 51 is removed.

Alternatively, the BSC 23 may itself be configured to identify RSVP protocols, and to intercept packets containing them and route them to the gateway node 60 as a circuit-switched call by way of the VMSC 24, instead of by way of the SGSN 50. This allows standard mobile data terminals to be used, which transmit packets containing the RSVP protocol, but requires modification of the network infrastructure at BSC level.

In a third possible arrangement, the gateway node 60 is arranged to intercept packets received over the packet network (SGSN 50) and instruct the base station to divert any subsequent packets from the same source over the circuit-switched network (24, 28). This concentrates the additional functionality in the gateway node 60, (where the functionality for the return path also resides), and is compatible with standard VoIP terminals and base site controllers, but requires the gateway node to decompile the packet to read origin address data. It should also be noted that the gateway node 60 cannot act to divert a call by way of the circuit-switched route 29, 24, 28, 61 until at least one packet has been transmitted by way of the packet-switched route 50, 51.

FIG. 7 is a schematic diagram showing the interrelationships between the various functional elements of the gateway node 60 in detail. The gateway node 60 shown includes the means to redirect packet-switched voice calls received from a terminal 21 by way of the SGSN 50, as described above, as well as incoming from other networks 52.

As is conventional with processor-based technology, the various functional elements may be embodied in software in a general-purpose computer. Moreover, certain functions occur at more than one point in the system, and are not necessarily embodied in distinct physical elements.

The gateway node 60 can handle packetised signals to or from the packet data network 52 (FIG. 6), and direct them as appropriate either to the gateway support node 51, and thence through the packet switched system 50, or to the Mobile Switching Centre 28. It can also feed signals into the packet data network 52 from the gateway support node 51 and from the Mobile Switching Centre 28.

Packet signals arriving from the packet data network 52 enter the gateway node at an input 70 and are first inspected by a header recognition element 71. Packets carrying the RSVP protocol are identified by the header recognition element 71, which controls a routing element 72 to divert any packet having this protocol to an output 73. Packets not having the RSVP protocols are directed to an output 74 where they are fed to the gateway GPRS support node 51 for onward transmission in the conventional GPRS manner.

Packets routed to the output 73 are next monitored by an address-monitoring element 75. The address-monitoring element 75 reads the address of the first packet, and encapsulates the header with the point code of the nearest GMSC 28. The GMSC can then interrogate the HLR 26, as for a normal circuit-switched call. The initial packet may have information regarding the capability of the terminal equipment, which can be used to identify whether the destination terminal is a voice terminal 20 or a data terminal 21. Alternatively, the address monitor 75 may retrieve such information from the HLR 26, making use of the equipment identity (EIN) corresponding to the destination address (user number) in the HLR 26. If the terminal equipment is determined by the address monitor 75 to have a voice capabilities application running (such as VoIP), or requires a circuit-switched data set-up, the address monitor 75 labels the set up as "data" and the set-up is arranged as for normal GSM circuit-switched data calls. If the terminal equipment has only traditional GSM voice applications running then the address monitor 75 labels the set up as "speech" and causes the header information to be removed by a header removal unit 77 before transmission. In this case the packet is then speech encoded at the BSC 23 as for a normal GSM speech call.

No further interaction with the HLR 26 is required for subsequent packets for the same address. The address is recognised by the address monitor 75, and the packets are transmitted over the circuit-switched connection which already has been set up, having their header information retained or removed as required.

The gateway node 60 shown in FIG. 7 is also configured to handle incoming packets from the gateway Mobile Switching Centre 28. On receiving the packets from the GMSC the Gateway node 60 translates the point code of the Gateway node to that of the GGSN 51 in a translation unit 76, and puts that address on the header. It caches this information to enable faster translation. The GGSN 51 receives the packet, strips off the encapsulated header, identifies the original destination IP address sent by the terminal and forwards it onto the IP network to be routed accordingly.

If a packet is addressed to a destination served by the same Mobile Switching Centre 28 from whence it arrived, an address monitoring element 75a transmits an instruction to a second routing element 78 to re-route the packet back to the Mobile Switching Centre 28. If this is the first such packet, this requires the creation of a circuit-switched connection to the destination, under the instructions of the first address monitor 75, and if appropriate also removing the header information in the header removal unit 77. The address monitor 75a may also cause a redirection unit 79 to instruct the Mobile Switching Centre 28 to establish a direct connection, from the circuit on which that packet arrived to the circuit to which the packet is to be directed. This avoids subsequent packets on that particular connection from being "tromboned", that is, routed from the Mobile Switching Centre 28 to the gateway node 61, only to be returned to the Mobile Switching Centre 28. This redirection function can only be performed if the address monitor 75a identifies the destination terminal as one which does not require the removal of the header information, as packets which require such removal must still travel by way of the header removal unit 77.

The operation of the invention will now be described in detail. Firstly there will be described the standard Internet protocol headers which are used when carrying a voice call over the Internet. Two protocols are provided for use with voice transmissions made over the Internet in order to reduce the problems caused by the packet-switching nature of the system. Firstly, a reservation protocol (RSVP) is provided. This indicates to the packet switching network that a route should be identified for the use of that call, so that all packets take the same route. Typically, this only gives priority to such calls rather than giving them an absolute reservation. However this nevertheless ensures that all packets will be routed over the same route and will hence have a similar delay. Secondly, there is a time stamp or "Real Time Protocol" (RTP). This arranges that if any given packet has not been transmitted within a certain limited time frame it should be discarded at the terminal. For a voice call this is acceptable, as the loss of a particular packet is much less important than it is in a normal data call, where all packets must be received if the data is not to be corrupted. Both protocols can be used in parallel in order to ensure that a suitable quality voice signal can be transmitted over the packet network within the specified delay constraints. In the present embodiment the RSVP protocol is used.

In the arrangement shown in FIG. 6, the gateway node 60 reads individual incoming packets received over another packet-switched network 52, inspects them for RSVP protocols, and routes such packets to a circuit-switched connection on the circuit-switched side of the cellular network. The first packet of such a call also causes the Home Location Register 26 to identify the destination 21 of the call, and open a switched circuit between the gateway MSC 28 and the user 21, including a radio channel 30. All subsequent packets having the same header are then similarly routed over the same circuit, which is maintained until the end of the message is identified either by a predetermined "end" protocol, or by the absence of any packets in a period of predetermined duration.

Figure 8:
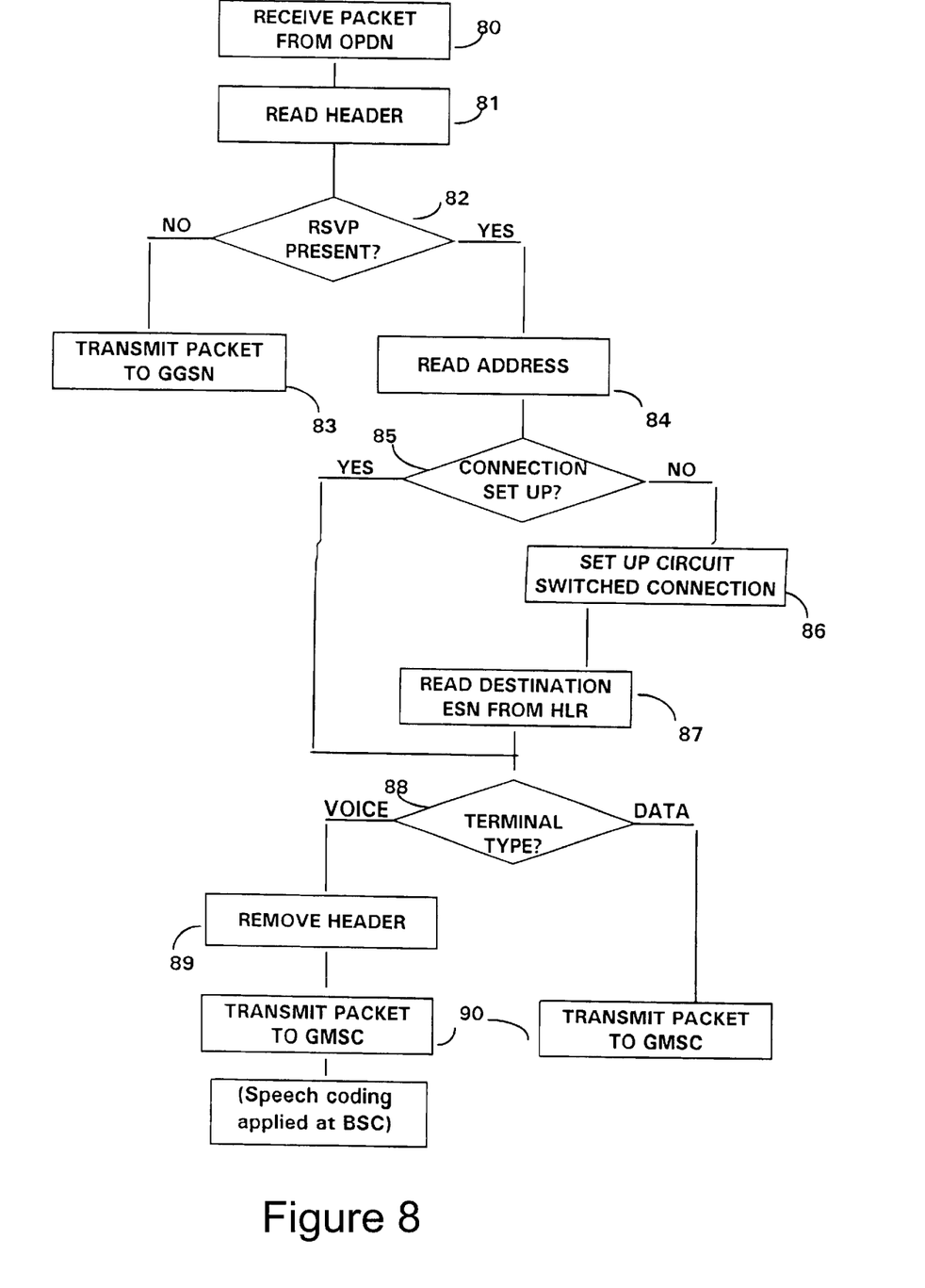
FIG. 8 shows the steps of the process for handling packet data received by the gateway node 60 from the packet data network 52.

As shown in FIG. 8, when a packet is received from the packet data network 52 (step 80) the gateway node 60 first of all reads the header information (step 81) and identifies whether the RSVP protocol is present. If it is not present then the packet is transmitted (step 83) to the GPRS node 50 as in the conventional GSM/GPRS system.

If the relevant protocol is recognised then the packet is routed to the address monitor 75, which reads the address information in the header (step 84). It then forwards the packet to the Mobile Switching Centre 28. It then allocates the relationship in the Gateway Node 60 so that any further packets arriving for that address will be automatically switched to the circuits assigned for the 'call'. The GMSC 28 processes the call as if it were a circuit-switched call (either data or speech).

The information about the type of application and terminal capabilities running will be available in the initial packet itself and the terminal identity stored in the HLR. It is here that the call is classed as data (no change to header information required, i.e. for terminals running VoIP) or speech (header information will be removed and the speech encoded at the BSC).

Figure 9:
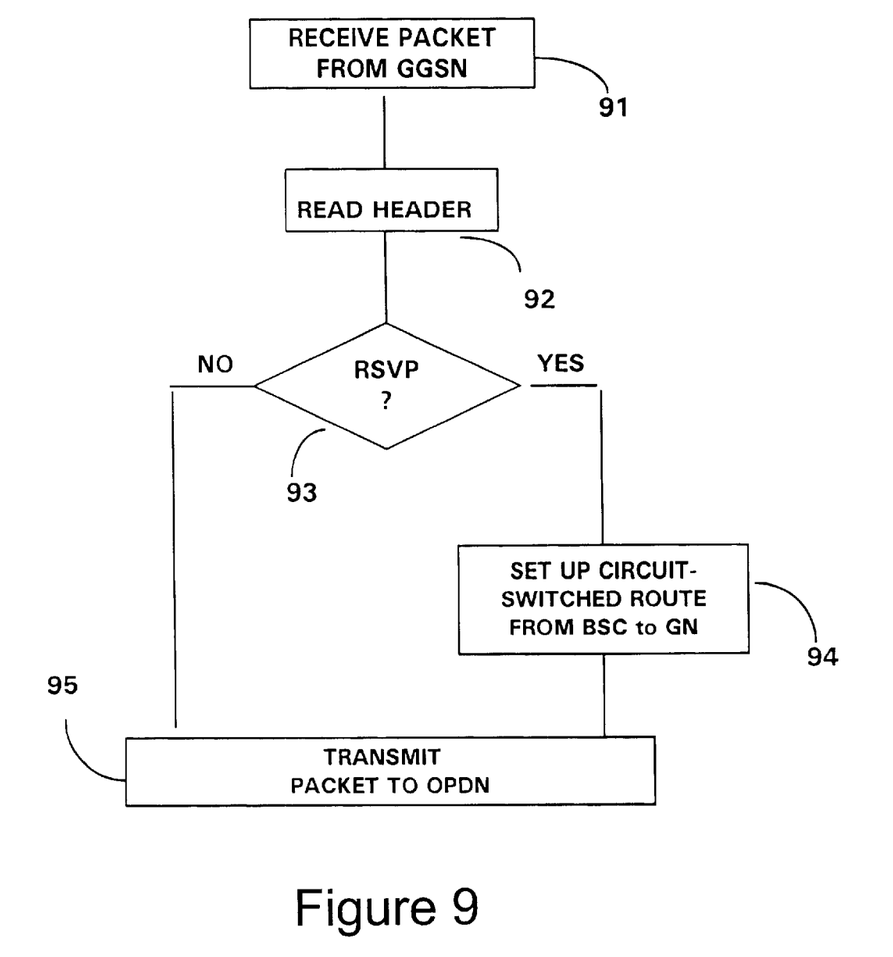
FIG. 9 shows the process operated when the gateway node 60 receives packet data from the gateway signalling node 51.

Once the circuit-switched connection has been set up (step 86) and the destination equipment serial number (ESN) has been called from the Home Location Register 26 (step 87) the destination ESN is stored. This allows the decision (step 88) to be made for subsequent packets as to whether to remove the header information (step 89), without further reference to the Home Location Register 26. For terminal-originating packets the terminal 21 may determine whether the request is for a circuit-switched or a packet-switched mechanism, according to the presence or otherwise of the RSVP protocol. Alternatively, the base site controller 23 may be arranged for data calls to be directed by way of the circuit-switched route if the RSVP protocol is detected. FIG. 9 illustrates a third possibility, carried out by the gateway node 60, when packet information is received from a terminal 21 by way of the GMSC 28, which allows the gateway node itself to set up a circuit-switched connection from a terminal 21 to the gateway node 60. This allows the use of conventional terminals and cellular infrastructure.

When a packet is received from the SGSN 50 (step 91) the header information is read (step 92) by a header recognition unit 71a, and the nearest GGSN address 51 is added (translator 76). The packet is then forwarded to the GGSN 51 which removes its own GGSN address, and then transmits the packet to the correct destination packet data network 52 in the normal way (step 94).

However, if the header recognition unit 71a recognises that there is an RSVP request (step 93), it reads the IP origin address from the IP header. Using this information, it retrieves the equivalent of the MSISDN (directory number) of the originating terminal from the HLR 26, using the IP origin address, and encapsulates the address onto the packet. This enables the elements 23, 24, 28 of the circuit-switched system to process a call set up as if it were a normal circuit-switched GSM call (step 95). The initial packet is then forwarded by way of the GGSN 51 in the normal way, but subsequent packets arrive over the bridge link 61 from the circuit-switched route, and are handled as will now be described with reference to FIG. 10.

Figure 10:
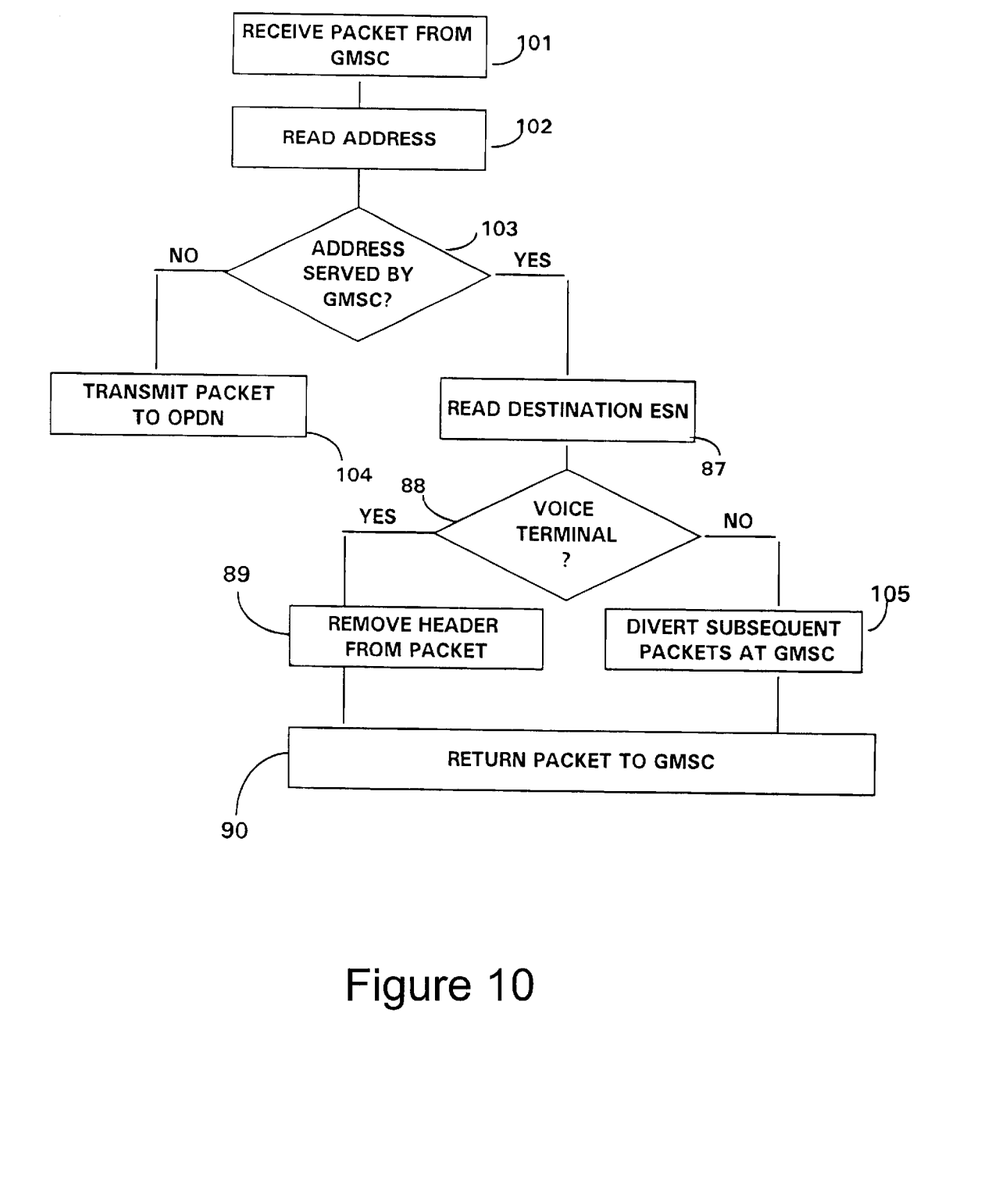
FIG. 10 shows the process performed by the gateway node when packet data is received from the Mobile Switching Centre 28.

FIG. 10 illustrates the functioning of the gateway node 60 on receipt of a packet from the gateway Mobile Switching Centre 28. It will be appreciated that any packet received over this route will form part of a delay-intolerant circuit-switched message. These are the only types of packets which will be routed by way of the circuit-switched system and the link 61, having been diverted (by the process just discussed with reference to FIG. 9) in response to the initial packet of the message, or by the BSC 23 or terminal 21. Once a packet has been received over the link 61 (step 101) the second address monitor 75a reads the address from the header information in the packet (step 102). If the address to which the packet is destined is not currently served by the same Mobile Switching Centre 28 as that with which the gateway node has a connection by way of the bridging link 61, the packet is simply transmitted to the packet data network 52 (step 104). However, if the same Mobile Switching Centre 28 serves the address, then the call is routed back to the Mobile Switching Centre 28. As with packets received from the packet data network 52, a number of processes are performed before onward transmission of the packet. Where these steps are the same as in FIG. 8, the same reference numerals are used. Firstly, the address monitor 75 retrieves the serial number of the destination terminal from the Home Location Register 26 (step 87). If this serial number corresponds to that of a voice terminal (step 88) the header information is removed by the header removal unit 77(step 89) and the packet is then transmitted to the Mobile Switching Centre 28 (step 90) for onward transmission to the voice terminal 20. Subsequent packets will also require the header information to be removed, and will thus need to be handled by the process of steps 101, 102, 103, 87, 88, 89 and 90. As an alternative, the gateway node 60 may be adapted to allow header information to be removed from all packets to a given destination, under instruction from the HLR 26.

If the equipment serial number is not identified as belonging to a voice terminal 20, the Gateway Node may instruct the GMSC 28, by means of Mobile Applications Part 27, to route the call direct to the destination mobile unit 21 (step 105). This makes the call circuit-switched throughout, and avoids the "tromboning" of the call (that is, the routing of a signal over the bridge link 61 only for the node 60 to re-transmit it back over the same bridge link 61). The first packet is then transmitted back to the Mobile Switching Centre 28 for onward transmission to the data terminal 21 (steps 105, 90). However, subsequent packets do not involve the gateway node 60, as the Mobile Switching Centre 28 is instructed (step 105) to route them directly to the destination terminal.

What is claimed is:

1. A method of selecting routing for a corruption-intolerant or delay-intolerant call type between a terminal and a packet-switching gateway such that a corruption-intolerant call is routed by a packet-switching system and a delay-intolerant call is routed by a circuit-switched system to or from the packet-switched gateway, wherein the presence or absence of a data protocol specific to one of the types of call is recognized and the routing between the gateway and terminal selected accordingly, and wherein the gateway detects the type of destination terminal to which the call is to be transmitted, and selects a first mode of operation in which the protocol is retained in the transmission, or a second mode of operation in which the protocol is removed, according to the destination type.

2. A method according to claim 1, comprising the step of intercepting packetized call set-up data, identifying whether the said protocol is incorporated in the packet-based call, and if it has been so incorporated, switching the call from a packet-based system to a circuit-switched system.

3. A method according to claim 1, wherein the destination of a call is identified from an address header of the first packet of a call, a switched circuit is opened between the gateway and the destination, and subsequent packets having the same header are then similarly routed over the switched circuit, which is maintained until the end of the message.

4. A method according to claim 1 wherein if a packet received by the packet-switching gateway over a circuit-switched system is for onward transmission to another destination served by the same circuit-switched system, the call is redirected to the destination without passing through the packet-switching network, thus making the call circuit-switched throughout.

5. Apparatus for routing corruption-intolerant and delay-intolerant calls between a terminal and a packet-switching gateway such that a corruption-intolerant call is routed by a packet-switching system and a delay-intolerant call is routed by a circuit-switched system to or from the packet-switched gateway, the apparatus comprising means for recognizing the presence or absence of a data protocol contained in a data protocol contained in a data packet of the call, and means for routing the call between the gateway and the terminal accordingly;

means for detecting the type of destination terminal to which the call is to be transmitted; and means for selecting a first mode of operation in which the protocol is retained in the transmission, or a second mode of operation in which the protocol is removed according to the destination type detected.

6. An apparatus according to claim 5, comprising means for intercepting packetized call set-up and identifying whether the protocol is incorporated in the packet-based call, and means for switching calls incorporating such protocols from a packet-switched system to a circuit-switched system.

7. A packet switching gateway according to claim 5, further comprising:

a routing apparatus, the routing apparatus including means for identifying packets received over a circuit-switched system whose destinations are other destinations served by the same circuit-switched system; and redirection means for transmitting said packets received over said circuit-switched system to the destination without passing through the packet-switching network, thus making the call circuit-switched throughout.

8. A packet switching gateway according to claim 7, wherein the routing apparatus comprises means for identifying the destination of a call from an address header of the first packet of a call;

means for opening a switched circuit between the gateway and the destination, and maintaining the circuit for the duration of the message; and means for routing subsequent packets having the same header over the same circuit.

9. A method of routing calls between a terminal and a packet-switching gateway, the method comprising:

routing a corruption-intolerant call by a packet-switching system;

routing a delay-intolerant call by a circuit-switched system to or from the packet-switched gateway, wherein the presence or absence of a data protocol specific to call type is recognized and the routing between the gateway and terminal selected accordingly; and wherein the packet-switched gateway detects the type of a destination terminal to which a call is to be transmitted, and selects a first mode of operation in which a protocol is retained in the transmission, or a second mode of operation in which the protocol is removed, according to the destination type.

10. An apparatus for routing corruption-intolerant and delay-intolerant calls between a terminal and a packet-switching gateway, the apparatus comprising:

means for routing a corruption-intolerant call by a packet-switching system;

means for routing a delay-intolerant call by a circuit-switched system;

means for recognizing the presence or absence of a data protocol contained in a data protocol contained in a data packet of the call;

means for routing the call between the gateway and the terminal;

means for detecting the type of a destination terminal to which a call is to be transmitted, and means for selecting a first mode of operation in which a protocol is retained in the transmission, or a second mode of operation in which the protocol is removed, according to the destination terminal.

* * * * *